United States Patent
Jose et al.

(10) Patent No.: US 10,250,497 B1
(45) Date of Patent: Apr. 2, 2019

(54) AVOIDING FALSE DUPLICATE NETWORK ADDRESS DETECTION IN VIRTUAL ROUTER REDUNDANCY PROTOCOL (VRRP) SCENARIOS

(71) Applicant: Juniper Networks, Inc., Sunnyvale, CA (US)

(72) Inventors: Jimmy Jose, Hosur (IN); Reji Thomas, Bangalore (IN); Sandip Kumar Ghosh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 113 days.

(21) Appl. No.: 15/616,467

(22) Filed: Jun. 7, 2017

(51) Int. Cl.
*H04L 12/713* (2013.01)
*H04L 12/741* (2013.01)
*H04L 12/823* (2013.01)
*H04L 29/08* (2006.01)
*H04L 29/12* (2006.01)

(52) U.S. Cl.
CPC ............ *H04L 45/586* (2013.01); *H04L 45/74* (2013.01); *H04L 47/32* (2013.01); *H04L 61/2007* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 2004/0083306 A1* | 4/2004 | Gloe | ............... | H04L 29/12066 709/245 |
| 2004/0202186 A1* | 10/2004 | Kimura | ............... | H04L 12/5601 370/395.65 |
| 2005/0177762 A1* | 8/2005 | Singh | ............... | H04L 69/40 714/4.1 |
| 2005/0265261 A1* | 12/2005 | Droms | ............... | H04L 12/2801 370/255 |
| 2010/0218247 A1* | 8/2010 | Nice | ............... | H04L 63/20 726/12 |
| 2013/0191463 A1* | 7/2013 | Thubert | ............... | H04L 61/6059 709/206 |

OTHER PUBLICATIONS

Thomson et al., rfcmarkup "IPv6 Stateless Address Autoconfiguration", https://tools.ietf.org/html/rfc2462, Dec. 1998, 25 pages.
Hinden et al., rfcmarkup, "Virtual Router Redundancy Protocol (VRRP)", https://tools.ietf.org/html/rfc3768, Apr. 2004, 27 pages.
Nadas et al., rfcmarkup, "Virtual Router Redundancy Protocol (VRRP) Version 3 for IPv4 and IPv6", https://tools.ietf.org/html/rfc5798, Mar. 2010, 40 pages.
Moore, rfcmarkup, "Optimistic Duplicate Address Detection (DAD) for IPv6", https://tools.ietf.org/html/rfc4429, Apr. 2006, 18 pages.

* cited by examiner

*Primary Examiner* — Alex Skripnikov
(74) *Attorney, Agent, or Firm* — Harrity & Harrity, LLP

(57) ABSTRACT

A first network device may activate the first network device as being associated with a Virtual Router Redundancy Protocol (VRRP) group. The first network device may receive, from a second network device, a duplicate address detection message. The first network device may compare a data link layer address associated with the duplicate address detection message and a Virtual Media Access Control (VMAC) address of the VRRP group. The first network device may disregard the duplicate address detection message after comparing the data link layer address and the VMAC address of the VRRP group.

20 Claims, 8 Drawing Sheets

AVOIDING FALSE DUPLICATE NETWORK ADDRESS DETECTION IN VIRTUAL ROUTER REDUNDANCY PROTOCOL (VRRP) SCENARIOS

BACKGROUND

VRRP is a computer networking protocol that may be used to provide redundancy for a set of network devices associated with a network (e.g., an Internet Protocol (IP) network, an IP subnetwork, etc.). In some implementations, VRRP may provide redundancy for the set of network devices by assigning address information associated with the set of network devices to a particular network device of the set of network devices. The particular network device that is assigned the address information may route traffic via the network. When the particular network device goes offline, another network device of the set of network devices may be assigned the address information and the other network device may route traffic via the network. By assigning the address information to network devices in such a manner, VRRP may increase the reliability of the network devices.

SUMMARY

According to some possible implementations, a first network device may include one or more processors to activate the first network device as being associated with a Virtual Router Redundancy Protocol (VRRP) group. The VRRP group may include a plurality of network devices. The one or more processors may provide, to a second network device, a first duplicate address detection message after activating the first network device. The plurality of network devices may include the second network device. The first duplicate address detection message may include a virtual Internet Protocol (VIP) address of the VRRP group. The one or more processors may receive, by the first network device and from the second network device, a second duplicate address detection message after providing the first duplicate address detection message. The second duplicate address detection message may include a data link layer address. The second duplicate address detection may identify that the second network device has ownership of the VIP address of the VRRP group. The one or more processors may compare the data link layer address and a Virtual Media Access Control (VMAC) address of the VRRP group after receiving the second duplicate address detection message. The one or more processors may disregard the second duplicate address detection message after comparing the data link layer address and the VMAC address of the VRRP group.

According to some possible implementations, a non-transitory computer-readable medium may store one or more instructions that, when executed by one or more processors, cause the one or more processors to activate a first network device as being associated with a Virtual Router Redundancy Protocol (VRRP) group. The VRRP group may include a plurality of network devices. The one or more instructions may cause the one or more processors to determine that a second network device is associated with the VRRP group. The plurality of network devices may include the second network device. The one or more instructions may cause the one or more processors to determine to forego performing a duplicate address detection process based on determining that the second network device is associated with the VRRP group. The one or more instructions may cause the one or more processors to assign a master status to the first network device. The one or more instructions may cause the one or more processors to provide a notification message based on assigning the master status to the first network device without having performed a duplicate address detection process in a time period from activating the first network device to providing the notification message According to some possible implementations, a method may include activating, by a first network device, the first network device as being associated with a Virtual Router Redundancy Protocol (VRRP) group. The VRRP group may include a plurality of network devices. The method may include receiving, by the first network device and from a second network device, a duplicate address detection message. The plurality of network devices may include the second network device. The method may include comparing, by the first network device, a data link layer address associated with the duplicate address detection message and a Virtual Media Access Control (VMAC) address of the VRRP group. The method may include disregarding, by the first network device, the duplicate address detection message after comparing the data link layer address and the VMAC address of the VRRP group.

DETAILED DESCRIPTION

Figure 1A:
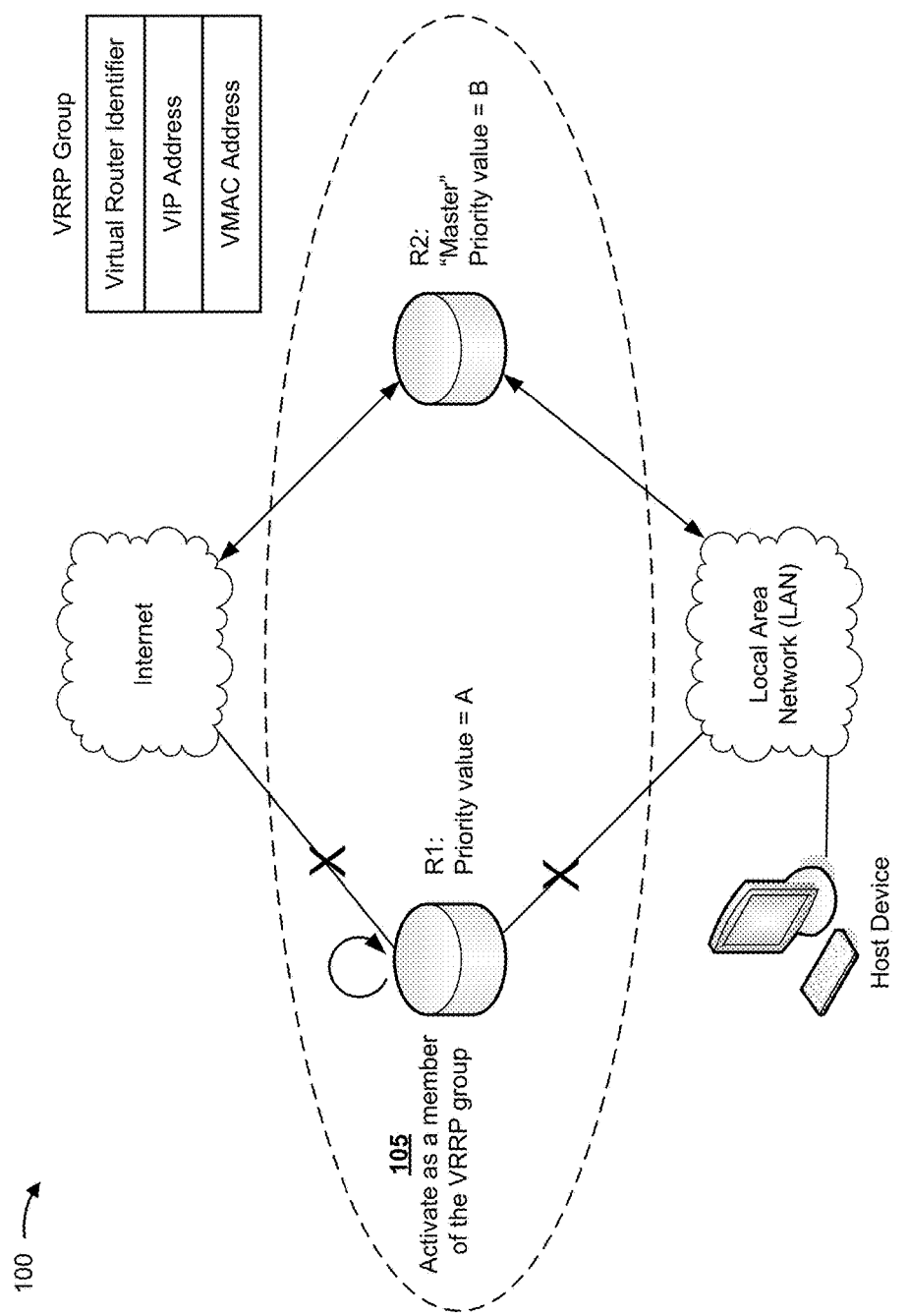
FIGS. 1A-1E are diagrams of an overview of an example implementation described herein.

The following detailed description of example implementations refers to the accompanying drawings. The same reference numbers in different drawings may identify the same or similar elements.

A VRRP group may include a plurality of network devices associated with a network. The network devices may each be capable of routing information via the network. A first network device of the plurality of network devices may be associated with master status in the VRRP group. Based on the master status, the first network device may use an address of the VRRP group to route traffic via the network.

Assume that a second network device is configured with the address of the VRRP group and is, thus, a member of the VRRP group. When the second network device activates, the second network device attempts to determine if the address of the VRRP group is being used by another device (e.g., the first network device, a host device, etc.) associated with the network.

In some cases, the second network device may fail to detect the presence of other network devices associated with the VRRP group (e.g., peers). As such, multiple network devices may be associated with a master status of the VRRP group simultaneously. Additionally, in some cases, the second network device may perform a duplicate address detection process to provide a message to the devices associated with the network to determine if the address of the VRRP group is available for use by the second network device or if the address is being used by another device (e.g., may provide a neighbor solicitation message). The second network device may receive a message from the first network device indicating that the first network device is using the address of the VRRP group (e.g., receive a neighbor advertisement message).

In this situation, the second network device may determine that the address of the VRRP group is being used by the first network device, which might cause the second network device to falsely mark the address of the VRRP group as a duplicate. The second network device may not recognize that the first network device is part of the same VRRP group as the second network device and, as a result, the second network device may incorrectly determine that the address is already being used.

Some implementations described herein permit a network device to avoid falsely determining that an address of a VRRP group is a duplicate in a situation where the network device activates as a member of a VRRP group and detects that there is already a master of the VRRP group.

For example, some implementations described herein enable a network device to activate and provide a neighbor solicitation message. Additionally, some implementations described herein enable the network device to receive, from another network device, a neighbor advertisement message after providing the neighbor solicitation message. Additionally, some implementations described herein enable the network device to compare data link layer address information (e.g., Layer 2 information associated with the Open Systems Interconnection (OSI) model) associated with the neighbor advertisement message and a Virtual Media Access Control (VMAC) address associated with a Virtual Internet Protocol (VIP) address of the VRRP group.

Further still, some implementations described herein enable the network device to determine that the data link layer address information and the VMAC address match. In such cases, the network device may disregard (e.g., drop, discard, etc.) the neighbor solicitation message. In this way, the network device may not falsely identify that the VIP address of the VRRP group is a duplicate. In other words, the network device may identify that the other network device is a peer in the VRRP group and, as such, may determine that the VIP address of the VRRP group is available for use (e.g., is not a duplicate address).

In some implementations, the network device may determine that an address of the VRRP group is available for use by the network device based on determining that another device in the VRRP group is associated with the address (i.e., by determining that another network device is a peer in the VRRP group, the network device may determine that DAD has already been performed). In some implementations, the network device may use the address of the VRRP group to route traffic via a network associated with the VRRP group based on determining that the address of the VRRP group is available for use. In some implementations, the network device may use the address of the VRRP group to route traffic via a network associated with the VRRP group without performing the duplicate address detection process.

By determining that another network device is part of the same VRRP group as the network device and that the other device is associated with the address of the VRRP group, the network device may determine that the address of the VRRP group is available for use. In this way, the network device may use the address of the VRRP group.

FIGS. 1A-1E are diagrams of an overview of an example implementation 100 described herein. As shown in FIGS. 1A-1E, example implementation 100 may include a first network device (shown as R1), a second network device (shown as R2), and a host device. As further shown in FIGS. 1A-1E, R1 and R2 may define a VRRP group. R1 and R2 may be associated with information of the VRRP group, based on being part of the VRRP group, such as a Virtual Router Identifier (VRID) of the VRRP group, a Virtual Internet Protocol (VIP) address of the VRRP group, and/or a Virtual Media Access Control (VMAC) address of the VRRP group.

As shown in FIG. 1A, assume that R2 is assigned the master status in the VRRP group. By being assigned the master status, R2 may route traffic from the host device to a network (e.g., the Internet) via another network (e.g., a Local Area Network (LAN)). In some implementations, R2 may route traffic using the VIP address of the VRRP group based on R2 being assigned the master status.

As further shown in FIG. 1A, assume that R1 is associated with a priority value (shown as A) and that R2 is associated with a priority value (shown as B). The priority values may allow R1 and/or R2 to determine which of R1 or R2 is to assume the master status during operation of the VRRP group. For example, if R1 and/or R2 determine that the priority value A is greater than the priority value B, then R1 may assume the master status. Alternatively, if R1 and/or R2 determine that the priority value A is less than the priority value B, then R2 may assume the master status. Assume for example implementation 100 that priority value A is greater than priority value B.

As further shown in FIG. 1A, and by reference number 105, R1 may activate as a member of the VRRP group. For example, R1 may come online, start, receive power, restart, reboot, return to power, etc. In some implementations, R1 may activate after R1 deactivates (e.g., goes offline, is removed from power, experiences an outage, malfunctions, etc.). For example, R1 may reboot after R1 experiences an outage. As further shown in FIG. 1A, R1 may not be connected to receive traffic from the host device. As an example, assume that R1 is associated with a master status based on activating as a member of the VRRP group. In this case, both R1 and R2 may be masters of the VRRP group simultaneously (i.e., concurrently). For example, R1 may fail to detect the presence of R2, and as such, both R1 and R2 may both be masters of the VRRP group simultaneously.

Figure 1B:
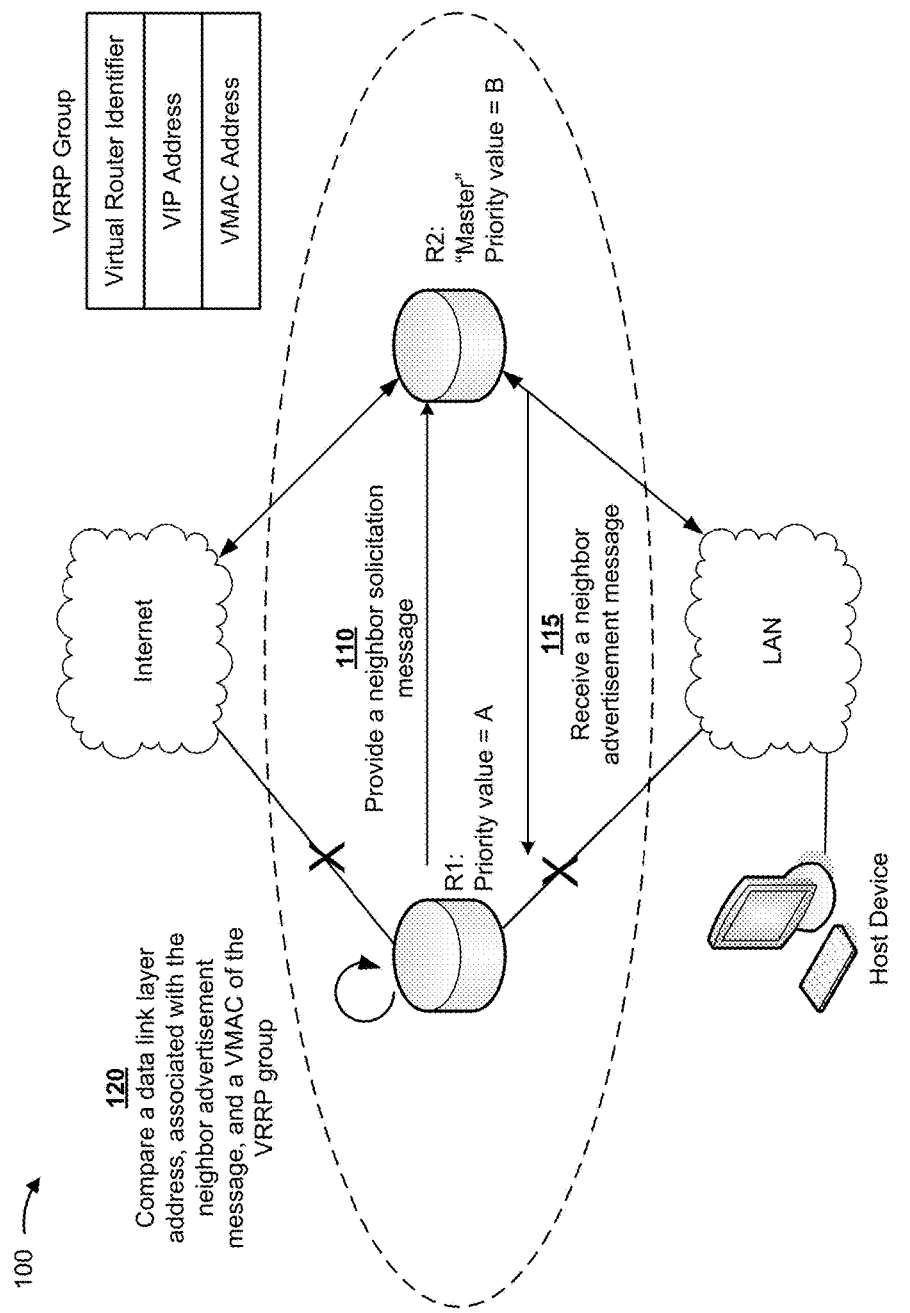

As shown in FIG. 1B, and by reference number 110, R1 may provide, to R2, a neighbor solicitation message after activating as part of the VRRP group. For example, R1 may be associated with an initialization state and may start DAD using a VIP address of the VRRP group (e.g., VRRP IP 1). In some cases, the DAD neighbor solicitation message may not include data link layer address information and, as such, R2 may not be capable of identifying that the DAD neighbor solicitation was sent by a VRRP group peer.

As shown by reference number 115, R1 may receive a neighbor advertisement message. For example, R2 may provide, to R1, a neighbor advertisement message after receiving the neighbor solicitation message from R1. In some implementations, the neighbor advertisement message may identify that R2 has ownership of the VIP address of the VRRP group (i.e., VRRP IP 1).

As shown by reference number 120, R1 may compare a data link layer address, associated with the neighbor advertisement message, and a VMAC address that is associated with the VRRP group (e.g., associated with VRRP IP 1). In this case, assume that R1 determines that the data link layer address and the VMAC address are the same (i.e., match). As such, R1 may determine that R2 is a peer in the VRRP group, and may disregard (e.g., drop, discard, etc.) the neighbor advertisement message. In this way, R1 may reduce a number of situations where R1 falsely determines that the VIP address of the VRRP group is a duplicate.

Figure 1C:
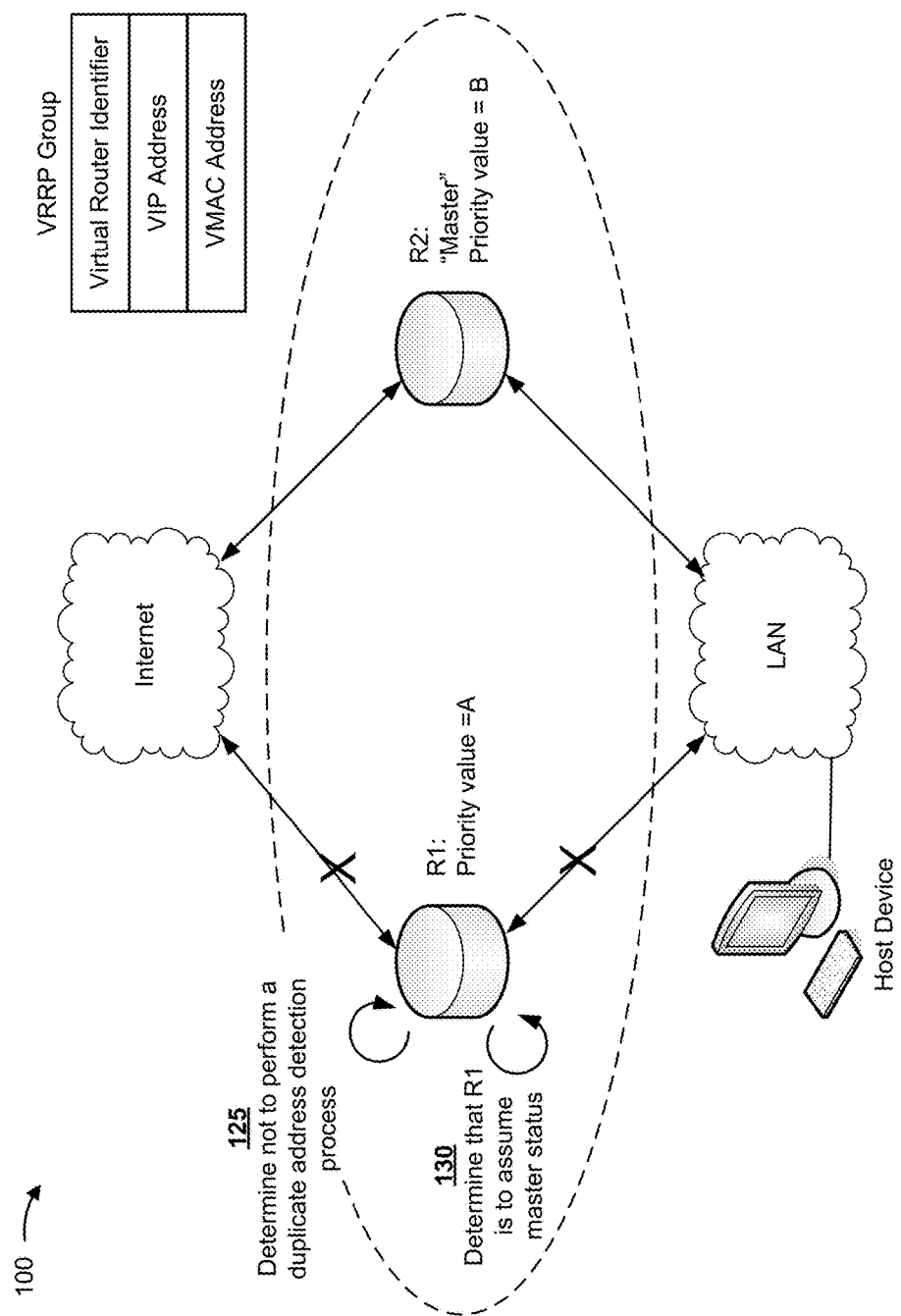

As shown in FIG. 1C, and by reference number 125, R1 may determine not to perform a duplicate address detection process. In other words, R1 may determine that R1 does not need to determine whether the VIP address, with which R1 is configured, is being used by another device. In some implementations, R1 may determine not to perform the duplicate address detection process based on determining that R2 is associated with the VRRP group (e.g., is a peer in the VRRP group). For example, R1 may make an assumption that since R1 is activating in a VRRP group that has a master of the VRRP group, the master (or some other device of the VRRP group) has already performed the duplicate address detection process to verify that the VIP address is acceptable to be used by the VRRP group. By not performing the duplicate address detection process, R1 may reduce network traffic and utilization of computing resources associated with R1 performing the duplicate address detection process.

As shown by reference number 130, R1 may determine that R1 is to assume master status. In some implementations, R1 may determine that R1 is to assume master status based on determining that the priority value associated with R1 (e.g., A) is greater than the priority value associated with R2 (e.g., B).

Figure 1D:
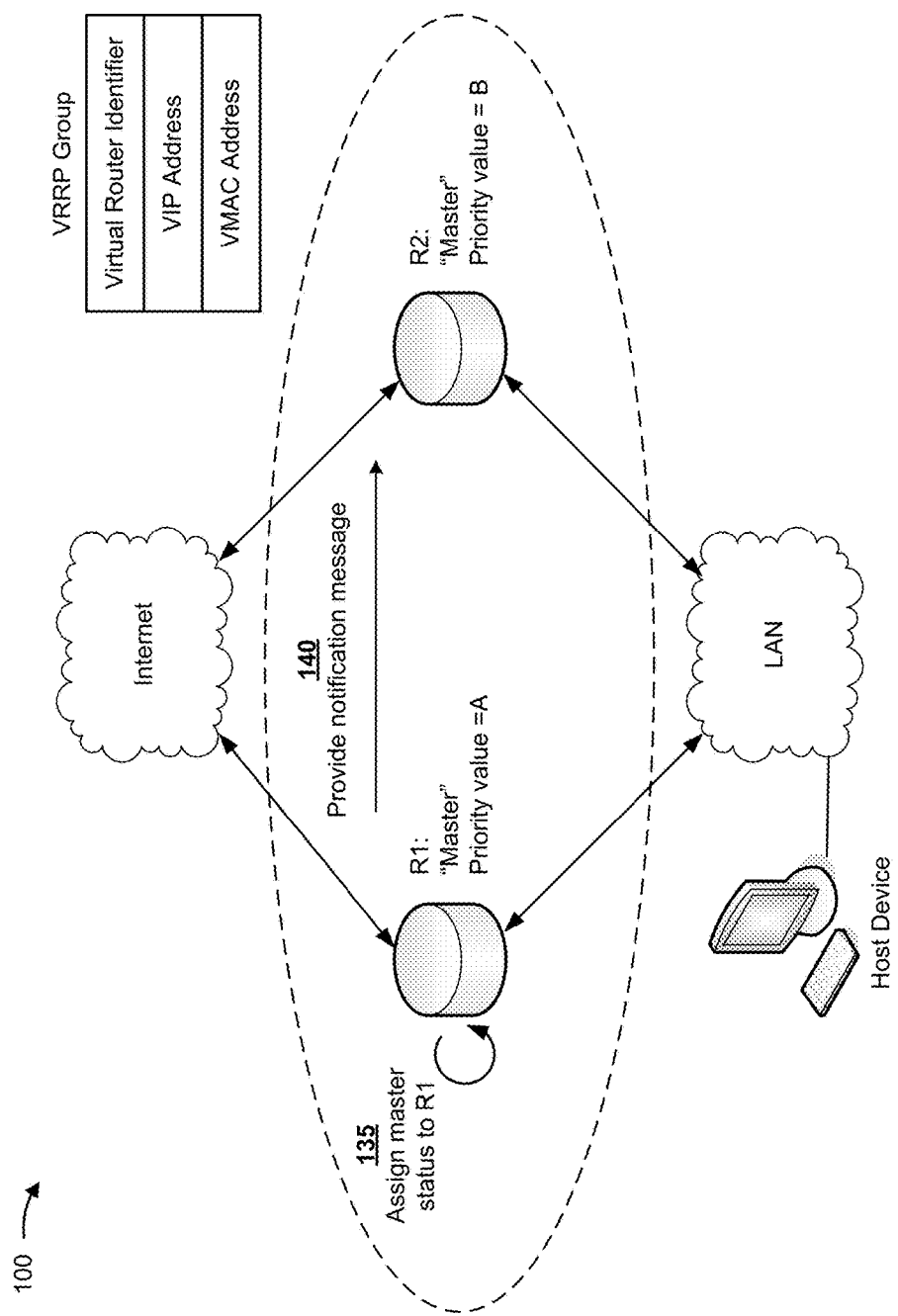

As shown in FIG. 1D, and by reference number 135, R1 may assign the master status to R1. By being assigned the master status, R1 may route traffic from the host device to the Internet via the LAN. In some implementations, R1 may assign the master status based on assigning the VIP address of the VRRP group to R1. In some implementations, R1 may route traffic from the host device to the Internet via the LAN using the VIP address of the VRRP group.

As shown by reference number 140, R1 may provide a notification message to R2 that includes information indicating that R1 is assigned the master status. In some implementations, R1 may provide the notification message after R1 assumes the master status. In some implementations, R2 may receive the notification message and determine that R1 is assigned the master status based on information in the notification message (e.g., the VRID of the VRRP group, the VIP address of the VRRP group, the VMAC address of the VRRP group, and/or the priority value associated with R1).

Figure 1E:
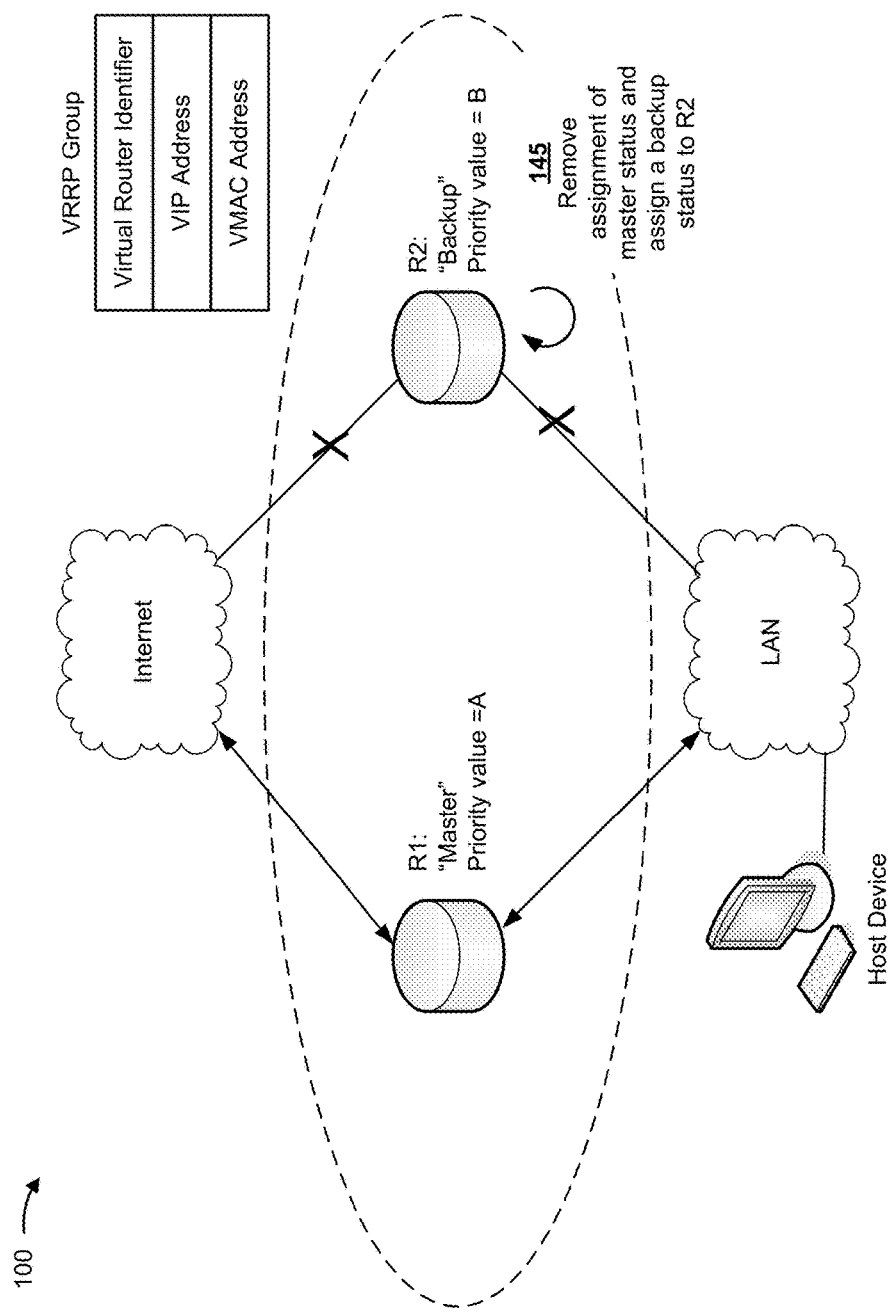

As shown in FIG. 1E, and by reference number 145, R2 may remove the assignment of the master status from R2 and assign a backup status to R2. For example, R2 may remove the assignment of the master status based on information in the notification message indicating that R1 is assigned the master status. In addition, R2 may assign the backup status in the VRRP group to R2. By being assigned the backup status, R2 may not be connected to receive traffic from the host device.

By determining that R2 is associated with the VRRP group of R1 (e.g., determining that R2 is a peer of R1 in the VRRP group), R1 may determine that the VIP address of the VRRP group is available for use by R1.

By determining not to perform a duplicate address detection process, R1 may also reduce network traffic and utilization of computing resources associated with R1 performing the duplicate address detection process. Further, R1 may reduce an amount of time associated with R1 determining that R1 is to assume the master status as compared to R1 performing the duplicate address detection process to determine that R1 is to assume the master status. Accordingly, R1 may be able to more quickly route traffic from the host device to the Internet via the LAN upon activation within the VRRP group. Additionally, R1 may allow for network stability associated with the LAN to be achieved more quickly based on the reduced amount of time associated with R1 determining to assume the master status.

As indicated above, FIGS. 1A-1E are provided merely as an example. Other examples are possible and may differ from what was described with regard to FIGS. 1A-1E. In the description to follow, two or more network devices may perform the functions described herein according to parameters associated with VRRP These two or more network devices will be referred to collectively as a "VRRP group." However, these two or more network devices may perform functions that correspond to the functions described herein based on parameters other than VRRP (e.g., a master/slave relationship, a redundancy group, etc.).

Figure 2:
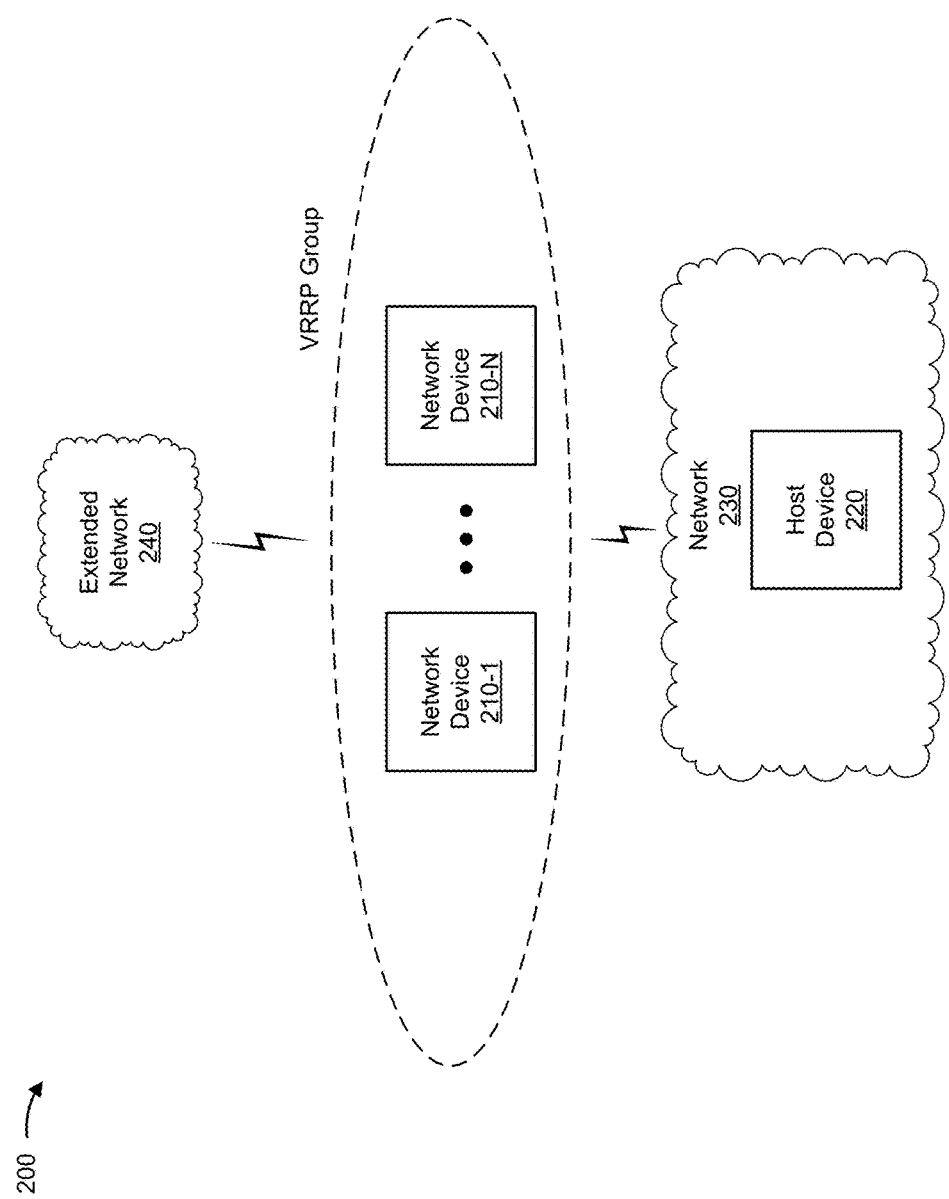
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include two or more network devices 210-1 through 210-N (N≥2) (hereinafter referred to collectively as "network devices 210," and individually as "network device 210"), host device 220, network 230, and extended network 240. Devices of environment 200 may interconnect via wired connections, wireless connections, or a combination of wired and wireless connections.

Network device 210 includes one or more devices (e.g., one or more traffic transfer devices) capable of processing and/or transferring traffic between devices (e.g., host devices, server devices, etc.) via a network, such as network 230, extended network 240, and/or the like. For example, network device 210 may include a firewall, a router, a gateway, a switch device, a hub, a bridge, a reverse proxy, a server (e.g., a proxy server), a Top of Rack (ToR) switch, a load balancer, a switch interface board, a controller, a switching element, a packet processing component, and/or the like. In some implementations, network device 210 may correspond to the first network device (i.e., R1) and/or the second network device (i.e., R2) shown in FIGS. 1A-1E.

Host device 220 includes one or more devices capable of receiving traffic from and/or providing traffic to network device 210 via a network, such as network 230, extended network 240, and/or the like. For example, host device 220 may include a client device, an endpoint device, a computing device, such as a laptop computer, a tablet computer, a handheld computer, a desktop computer, a mobile phone (e.g., a smart phone, a radiotelephone, etc.), a network device (e.g., an edge device, a router, a gateway, a firewall, a hub, a bridge, etc.), and/or the like. In some implementations, host device 220 may correspond to the host device shown in FIGS. 1A-1E.

Network 230 includes one or more wired and/or wireless networks (e.g., one or more wired and/or wireless subnetworks, etc.). For example, network 230 may include a cellular network (e.g., a fifth generation (5G) network, a long-term evolution (LTE) network, a code division multiple access (CDMA) network, a third generation (3G) network, another type of next generation network (NGN), etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In some implementations, network 230 may correspond to the LAN shown in FIGS. 1A-1E.

Extended network 240 may include one or more wired and/or wireless networks. For example, extended network 240 may include a cellular network, a PLMN, a LAN, a WAN, a MAN, an NGN, a telephone network, a private network, an ad hoc network, an intranet, the Internet, a fiber optic-based network, a cloud computing network, and/or the like, and/or a combination of these or other types of networks. In some implementations, extended network 240 may correspond to the Internet shown in FIGS. 1A-1E.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
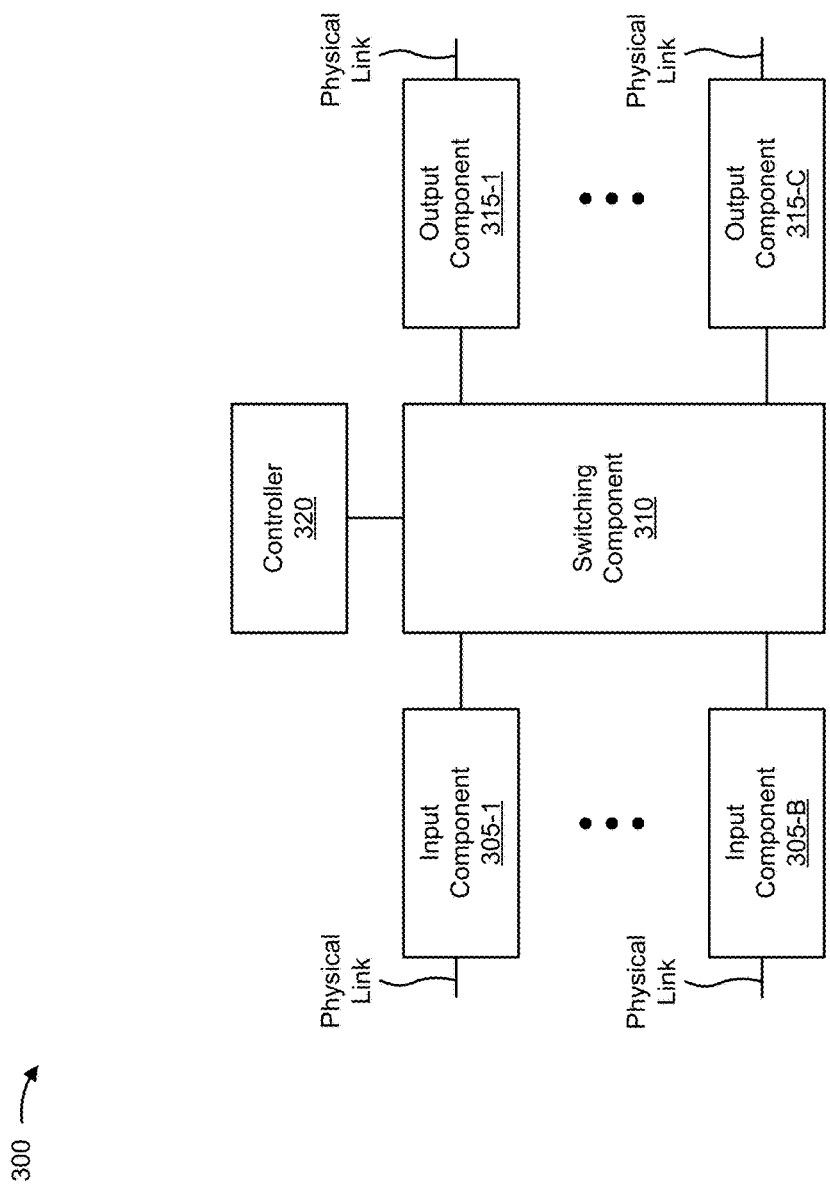
FIG. 3 is a diagram of example components of one or more devices of FIG. 2.

FIG. 3 is a diagram of example components of a device 300. Device 300 may correspond to network device 210 and/or host device 220. In some implementations, network device 210 and/or host device 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

In some implementations, device 300 may be implemented on one or more physical structures, such as one or more chasses. In some implementations, device 300 may be implemented within a cloud environment. For example, input component 305, switching component 310, output component 315, and/or controller 320 may be implemented on or more virtual machines executing on one or more cloud computing devices within a cloud environment.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
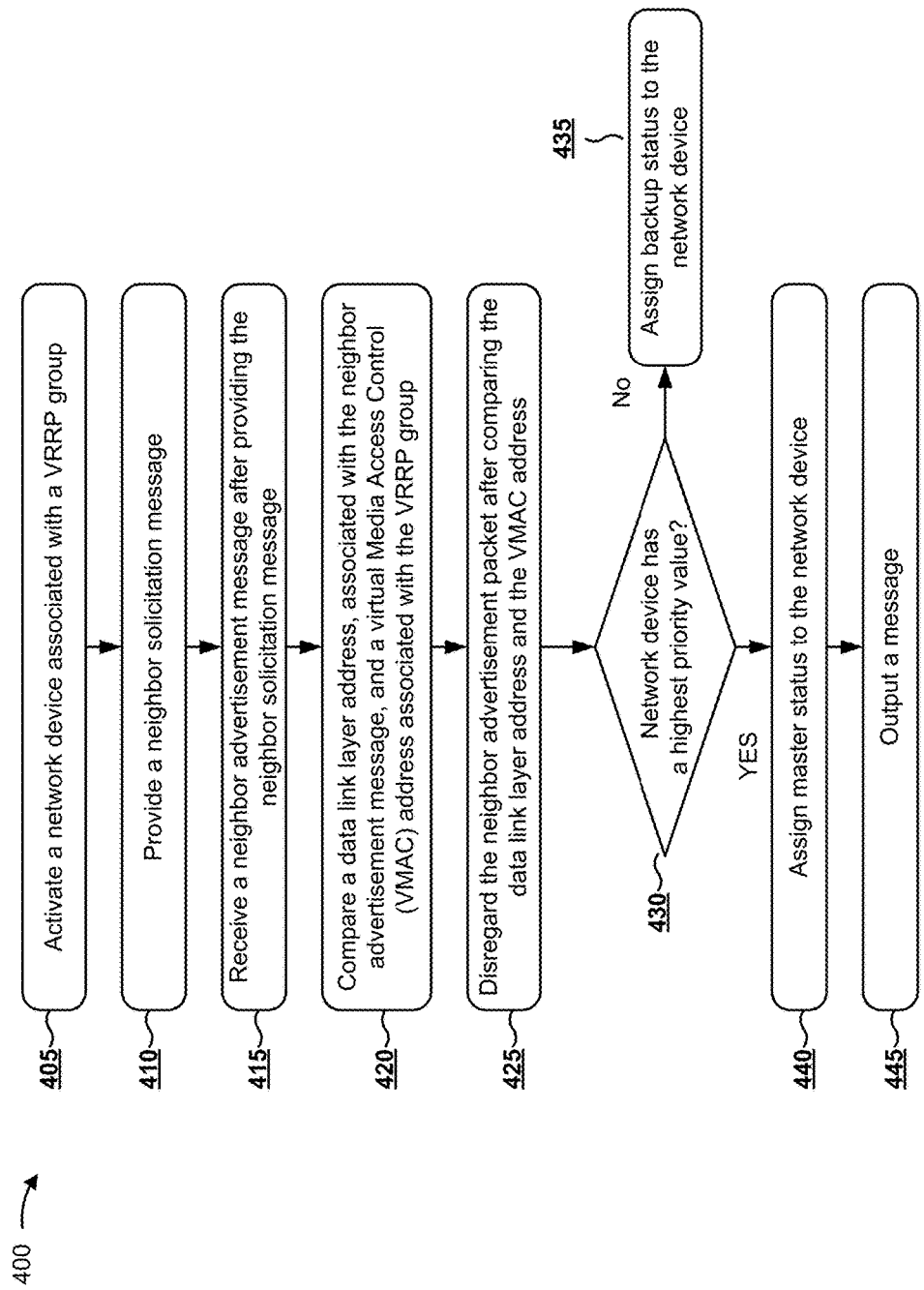
FIG. 4 is a flow chart of an example process for avoiding false duplicate address detection during use of VRRP.

FIG. 4 is a flow chart of an example process 400 for avoiding false detection of a duplicate network address during use of VRRP. In some implementations, one or more process blocks of FIG. 4 may be performed by network device 210-1. In some implementations, one or more process blocks of FIG. 4 may be performed by another device or a group of devices separate from or including network device 210-1, such as network device 210-N and/or host device 220.

As shown in FIG. 4, process 400 may include activating a network device associated with a VRRP group (block 405). For example, network device 210-1 may activate a network device (e.g., network device 210-1) associated with a VRRP group. In some implementations, the VRRP group may include a plurality of network devices 210, such as network device 210-1 and network device 210-N (and possibly one or more additional network devices 210). In some implementations, the VRRP group may include a single network device 210-1 (e.g., in a situation where network device 210-1 is the first network device 210 to join a network).

In some implementations, network device 210-1 may receive configuration information associated with the VRRP group. For example, network device 210-1 may receive the configuration information before or after network device 210-1 activates. In some implementations, network device 210-1 may be pre-configured with the configuration information (e.g., before network device 210-1 is activated within the VRRP group). In some implementations, network device 210-1 may receive the configuration information from host device 220 and/or another device (e.g., another host device 220, a network operator device, a network administrator device, etc.) associated with network 230 and/or extended network 240.

In some implementations, network device 210-1 may be associated with the VRRP group (e.g., may be a member of the VRRP group, etc.) based on being configured with (e.g., associated with, assigned, storing, accepting, etc.) information associated with the VRRP group that was included with the configuration information. For example, the information associated the VRRP group may include an identifier (e.g., a VRID of the VRRP group, etc.) of the VRRP group and/or address information (e.g., a VIP address of the VRRP group, a VMAC address of the VRRP group, etc.) of the VRRP group.

In some implementations, network device 210-1 may be associated with the VRRP group based on being configured with the identifier and/or the address information of the VRRP group. In some implementations, the VMAC address of the VRRP group may include a MAC address (e.g., a MAC address associated with Institute of Electrical and Electronics Engineers (IEEE) standard 802, etc.) and the identifier (e.g., the VRID of the VRRP group) of the VRRP group.

In some implementations, network device 210-1 may configure network device 210-1 with the information associated with the VRRP group. For example, network device 210-1 may configure network device 210-1 with the identifier of the VRRP group and/or the address information of the VRRP group to network device 210-1 (e.g., may accept or assign ownership of the identifier and/or the address information). In some implementations, network device 210-1 may store the information associated with the VRRP group locally (e.g., in main memory, in cache memory, in secondary memory, etc.) on network device 210-1 and/or on a storage component (e.g., tertiary storage, a hard disk drive (HDD), etc.) associated with network device 210-1.

In some implementations, network device 210-1 may be associated with a priority value (e.g., a first priority value). In some implementations, the priority value associated with network device 210-1 may be included with the configuration information that was received by network device 210-1. In some implementations, the information associated with the VRRP group may include the priority value associated with network device 210-1.

In some implementations, the priority value may allow network device 210-1 to determine whether network device 210-1 is to assume a master status during operation of the VRRP group. For example, if network device 210-1 is the sole member of the VRRP group or the priority value of network device 210-1 is a highest priority value of members of the VRRP group, then network device 210-1 may assume the master status for the VRRP group. Alternatively, if network device 210-1 is not the sole member of the VRRP group and the priority value of network device 210-1 is not the highest priority value of members of the VRRP group (i.e., at least one other member of the VRRP group has a higher priority value), then network device 210-1 may not assume the master status in the VRRP group. For example, network device 210-1 may assume a backup status in the VRRP group.

In some implementations, network device 210-1 may be associated with a priority value in a range from 1 to 255. In this example, a priority value of 1 may be a lowest priority value and a priority value of 255 may be a highest priority value. In some implementations, the priority value of network device 210-1 may be associated with a priority value in a range of priority values that is greater than, different from, a subset of, etc. the range from 1 to 255.

In some implementations, network device 210-1 may be associated with a non-activated status (e.g., a non-operational status, a non-connected status, a deactivated status, etc.) in the VRRP group prior to network device 210-1 activating (e.g., in the VRRP group). By being associated with the non-activated status, network device 210-1 may not be connected to receive traffic from a device (e.g., host device 220, etc.) associated with network 230 and/or extended network 240.

In some implementations, network device 210-1 may activate (e.g., come online, start, receive power, restart, reboot, return to power, etc.) within (e.g., as a member of) the VRRP group. In some implementations, network device 210-1 may activate after network device 210-1 deactivates (e.g., goes offline, is removed from power, experiences an outage, malfunctions, etc.). For example, network device 210-1 may reboot after network device 210-1 experiences an outage. In this way, network device 210-1 may activate network device 210-1 as being associated with a VRRP group.

As further shown in FIG. 4, process 400 may include providing a neighbor solicitation message (block 410). For example, network device 210-1 may provide a neighbor solicitation message to other network devices 210 (e.g., network device 210-N, another network device 210 in addition to network device 210-N, etc.) that are associated with the VRRP group (i.e., the VRRP group with which network device 210-1 is associated) after network device 210-1 activates within the VRRP group (e.g., as a member of the VRRP group).

In some implementations, the message may be associated with a duplicate address detection process. For example, the message may be associated with a discovery protocol, a neighbor discovery protocol, a Duplicate Address Detection (DAD) process for Internet Protocol Version 6 (IPv6), an Address Resolution Protocol (ARP) process for Internet Protocol Version 4 (IPv4), and/or the like.

In some implementations, network device 210-1 may determine to forego performing a DAD process based on determining that there are VRRP group peers. That is, if network device 210-1 determines that other network devices 210 are associated with the VRRP group, then network device 210-1 may determine to forego performing a DAD process. In this case, the VIP address of the VRRP group has already been validated on the network (e.g., the LAN) and a master of the VRRP group already has ownership of the VIP address of the VRRP group.

However, in some cases, network device 210-1 may fail to detect the presence of peers of the VRRP group. In some implementations, network device 210-1 may send the neighbor solicitation message based on failing to detect other peers of the VRRP group. That is, in some cases, network device 210-1 may fail to detect the presence of other network devices 210 that are part of the VRRP group. Additionally, in this situation, multiple network devices 210 may be masters of the VRRP group simultaneously. As such, another master of the VRRP group may reply to the neighbor solicitation message with a neighbor advertisement message that may cause the VIP address of the VRRP group to be falsely marked as duplicate and/or cause network device 210-1 from joining the VRRP group.

In some implementations, network device 210-1 may provide the neighbor solicitation message after determining that there are no other network devices 210 associated with the VRRP group. In some implementations, network device 210-1 may determine that a duplicate address detection process has not been performed to verify that address information of the VRRP group (e.g., a VIP address, etc.) is available for use by the VRRP group. In this way, network device 210-1 may determine that network device 210-1 is to perform the duplicate address detection process.

In some implementations, the duplicate address detection process may be associated with a discovery protocol, a neighbor discovery protocol, a DAD process for IPv6, an ARP process for IPv4, and/or the like.

In some implementations, network device 210-1 may perform the duplicate address detection process to determine whether the address information (e.g., the VIP address, etc.) associated with the VRRP group is assigned to another device (e.g., host device 220, another device in network 230, a network device 210 of another VRRP group, etc.) associated with network 230. For example, network device 210-1 may perform the duplicate address detection process to determine whether the VIP address associated with the VRRP group is assigned to another device.

In some implementations, network device 210-1 may perform the duplicate address detection process using address information (e.g., the VIP address, etc.) of the VRRP group. For example, network device 210-1 may perform the duplicate address detection process using the VIP address of the VRRP group that was stored by network device 210-1.

As further shown in FIG. 4, process 400 may include receiving a neighbor advertisement message after providing the neighbor solicitation message (block 415), and comparing a data link layer address, associated with the neighbor advertisement message, and a virtual media access control (VMAC) address associated with the VRRP group (block 420).

In some implementations, network device 210-N may receive, from network device 210-1, the neighbor solicitation message. Assume that network device 210-N includes master status and has ownership of the VIP address of the VRRP group. For example, in some cases, both network device 210-1 and network device 210-N may both include master status of the VRRP group simultaneously (i.e., concurrently).

In some implementations, the neighbor solicitation message may not include data link layer (e.g., Layer 2 of the Open Systems Interconnection (OSI) model). As such, network device 210-N may be incapable of identifying that the neighbor solicitation message was provided from a peer of the VRRP group.

In some implementations, network device 210-N may provide, to network device 210-1, a neighbor advertisement message after receiving the neighbor solicitation message from network device 210-1. In some implementations, the neighbor advertisement message may include address information (e.g., an IP address, a MAC address, etc.) of a network device 210 (e.g., network device 210-N), a priority value associated with a network device 210 (e.g., network device 210-N), information associated with the VRRP group, information associated with master status in the VRRP group, an identifier (e.g., the VRID) of the VRRP group, address information of the VRRP group, the VIP address of the VRRP group, the VMAC address of the VRRP group, and/or the like.

In some implementations, network device 210-1 may receive, from network device 210-N, the neighbor advertisement message and may compare information associated with the neighbor advertisement message and information associated with the VRRP group. In some implementations, network device 210-1 may parse the neighbor advertisement message, and identify information associated with the neighbor advertisement message after parsing the neighbor advertisement message.

In some implementations, network device 210-1 may compare a data link layer address associated with the neighbor advertisement message and a VMAC address associated with the VRRP group (e.g., associated with the VIP address of the VRRP group). For example, network device 210-1 may compare MAC information associated with the neighbor advertisement message and MAC information associated with the VIP address of the VRRP group. In some cases, the VIP address of the VRRP group may be bound to a specific VMAC in the VRRP group. In this way, network device 210-1 may determine, based on performing the MAC comparison, that network device 210-N is a peer in the VRRP group. Thus, network device 210-1 may reduce a number of situations where network device 210-1 falsely determines that the VIP address of the VRRP group is a duplicate.

In some implementations, network device 210-1 may determine whether another network device 210 (e.g., network device 210-N) is associated with the VRRP group based on determining that address information (e.g., a network address of network device 210-N, a MAC address of network device 210-N, etc.) in the message from the other network device 210 corresponds to address information of the VRRP group. For example, network device 210-1 may determine whether network device 210-N is associated with the VRRP group based on determining whether a MAC address of network device 210-N corresponds to (e.g., matches, is a subset of, can be used to generate, etc.) the VMAC address of the VRRP group.

As an example, assume that network device 210-1 determines that the data link layer address associated with the neighbor advertisement message corresponds to the VMAC address of the VRRP group. As described below, network device 210-1 may disregard the neighbor advertisement message in such a case.

As further shown in FIG. 4, process 400 may include disregarding the neighbor advertisement message after comparing the data link layer address and the VMAC address (block 425). For example, network device 210-1 may disregard (e.g., drop the packet, discard the packet, etc.) after determining that the data link layer address associated with the neighbor advertisement message corresponds to the VMAC address associated with the VRRP group (e.g., is associated with the VIP address of the VRRP group).

In this way, network device 210-1 may reduce false DAD in VRRP scenarios, such as the situation where network device 210-1 inaccurately determines that the VIP address of the VRRP group is not available for use. Thereby, some implementations described herein reduce situations where network device 210-1 marks the VIP address of the VRRP group as a duplicate. By identifying that a peer of the VRRP group has ownership of the VIP address, network device 210-1 may determine that the VIP address is available for use by the VRRP group.

In some implementations, network device 210-1 may determine to forego performing the duplicate address detection process based on determining that there is another network device 210 associated with the VRRP group as described above. For example, by determining that there is another network device 210 associated with the VRRP group, network device 210-1 may determine that there is an active member in the VRRP group, which means that a duplicate address detection process has already been performed to verify that the VIP address, of the VRRP group, is available to be used by the VRRP group. As a result, network device 210-1 may determine that network device 210-1 does not need to perform a duplicate address detection process to determine whether the VIP address, with which network device 210-1 is configured, is available to be used with the VRRP group. In other words, network device 210-1 may determine that another network device 210 has already performed the duplicate address detection process to verify that the VIP address is available to be used by the VRRP group.

By determining to forego performing a duplicate address detection process, network device 210-1 may reduce network traffic and utilization of computing resources associated with network device 210-1 performing the duplicate address detection process.

In some implementations, network device 210-1 may determine to forego performing the duplicate address detection process based on information included in a message (e.g., a notification message) from another network device 210 (e.g., network device 210-N, etc.) in the VRRP group. For example, network device 210-1 may determine to forego performing the duplicate address detection process based on the message including information that indicates that the other network device 210 is associated with the VRRP group. In some implementations, the information included in the message may be information of the VRRP group (e.g., the identifier of the VRRP group, the address information of the VRRP group, such as the VIP address or the VMAC address, etc.).

As further shown in FIG. 4, process 400 may include determining whether the network device has a highest priority value (block 430). For example, network device 210-1 may determine whether network device 210-1 includes a highest priority value of the VRRP group.

In some implementations, network device 210-1 may determine whether network device 210-1 has the highest priority value of the VRRP group to determine whether network device 210-1 is to assume the master status in the VRRP group. By determining whether network device 210-1 is to assume the master status, network device 210-1 may determine whether network device 210-1 is to be assigned the master status and whether network device 210-1 may route traffic from a device (e.g., host device 220, etc.) to extended network 240 via network 230, or vice versa.

In some implementations, network device 210-1 may determine whether network device 210-1 has the highest priority value of the VRRP group based on a priority value associated with network device 210-1. For example, network device 210-1 may determine that network device 210-1 has the highest priority value if network device 210-1 is associated with a highest possible priority value (e.g., 255 if the range of priority values is 0 to 255) in the VRRP group. In some implementations, and in situations where network device 210-1 is not associated with the highest possible priority value (e.g., 255) in the VRRP group, network device 210-1 may determine whether network device 210-1 has the highest priority value among the priority values of network devices 210 in the VRRP group, as described below.

In some implementations, network device 210-1 may determine whether network device 210-1 has the highest priority value of the VRRP group based on a priority value associated with network device 210-1 and a priority value associated with the one or more other network devices 210 of the VRRP group. For example, network device 210-1 may receive a message (e.g., a notification message) from one or more other network devices 210 of the VRRP group, where each message includes a priority value associated with a respective one of the one or more other network devices 210. Network device 210-1 may compare the priority value associated with each of the one or more other network devices 210 with the priority value associated with network device 210-1. If the priority value associated with network device 210-1 is higher (e.g., greater) than the priority value associated with each of the one or more other network devices 210, network device 210-1 may determine that network device 210-1 has the highest priority value. If the priority value associated with network device 210-1 is lower (e.g., less) than, or equal to, the priority value associated with any of the one or more other network devices 210, network device 210-1 may determine that network device 210-1 does not have the highest priority value.

In some implementations, network device 210-1 may be associated with a second (e.g., an updated, etc.) priority value after being associated with a first (e.g., an initial, etc.) priority value. For example, network device 210-1 may be configured with an initial priority value. After being configured with the initial priority value, network device 210-1 may receive configuration information. Based on the configuration information, network device 210-1 may be configured with an updated priority value that is different (e.g., a priority value that is higher than the initial priority, a priority value that is lower than the initial priority, etc.) than the initial priority value.

As further shown in FIG. 4, if the network device is not associated with the highest priority value of the VRRP group (block 430—NO), then process 400 may include assigning a backup status to the network device (block 435). For example, if network device 210-1 is not associated with the highest priority value, then network device 210-1 may assign backup status to network device 210-1 after determining that network device 210-1 does not have the highest priority value of the VRRP group.

In some implementations, network device 210-1 may assign the backup status in the VRRP group to network device 210-1 based on determining that the network device 210-1 does not have the highest priority value of the VRRP group. For example, network device 210-1 may assign the backup status based on network device 210-1 determining that network device 210-1 does not have the highest priority value, as described above.

In some implementations, network device 210-1 may remove an assignment of the master status in the VRRP group from network device 210-1. For example, network device 210-1 may remove the assignment of the master status based on determining that network device 210-1 does not have the highest priority value of the VRRP group. In some implementations, network device 210-1 may remove an assignment of the master status in the VRRP group prior to assigning the backup status to network device 210-1. In some implementations, network device 210-1 may remove the assignment of the master status based on assigning the backup status to network device 210-1.

In some implementations, network device 210-1 may not be connected to receive traffic from a device (e.g., host device 220, etc.) associated with network 230 and/or extended network 240 based on assigning the backup status in the VRRP group to network device 210-1. In this way, network device 210-1 may assign the backup status in the VRRP group to network device 210-1.

In some implementations, network device 210-1 may output a message related to the VRRP group after assigning the backup status to network device 210-1. In some implementations, network device 210-1 may output the message related to the VRRP group in a way that is the same or similar to that described elsewhere herein. In some implementations, the message may include information indicating that network device 210-1 was assigned the backup status in the VRRP group, and/or the priority value of network device 210-1.

As further shown in FIG. 4, if the network device is associated with the highest priority value of the VRRP group (block 430—YES), then process 400 may include assigning a master status to the network device (block 440). For example, network device 210-1 may assign the master status to network device 210-1 after determining that network device 210-1 has the highest priority value of the VRRP group.

By assigning the master status in the VRRP group to network device 210-1, network device 210-1 may take ownership of address information of the VRRP group (e.g., the VIP address, the VMAC address, etc.). For example, network device 210-1 may assign the address information of the VRRP group to network device 210-1. In some implementations, network device 210-1 may route traffic from a device (e.g., host device 220, etc.) to extended network 240 via network 230, or vice versa, (e.g., using the address information) based on taking ownership of the address information.

In some implementations, network device 210-1 may assign the master status in the VRRP group to network device 210-1 based on determining that network device 210-1 is to assume the master status in the VRRP group. For example, network device 210-1 may assign the master status in the VRRP group to network device 210-1 based on determining that network device 210-1 has the highest priority value of the VRRP group.

In some implementations, network device 210-1 may determine to forego performing a duplicate address detection process by network device 210-1 after assigning the master status to network device 210-1. Alternatively, network device 210-1 may assign the master status to network device 210-1 after determining to forego performing a duplicate address detection process by network device 210-1.

By assigning the master status to network device 210-1 after determining to forego performing a duplicate address detection process, network device 210-1 may reduce an amount of time associated with network device 210-1 assigning the master status to network device 210-1 as compared to network device 210-1 performing the duplicate address detection process to assign the master status to network device 210-1. Accordingly, network device 210-1 may be able to more quickly route traffic from a device (e.g., host device 220, etc.) to extended network 240 via network 230, or vice versa, based on the reduced amount of time. Additionally, network device 210-1 may allow for network stability associated with network 230 to be achieved more quickly based on the reduced amount of time.

As further shown in FIG. 4, process 400 may include outputting a message (block 445). For example, network device 210-1 may output a message relating to the VRRP group after assigning the master status to network device 210-1.

In some implementations, network device 210-1 may output the message based on assigning the master status to network device 210-1 without having performed the duplicate address detection process. In such a case, network device 210-1 may output the message based on assigning the master status to network device 210-1 and without having performed a duplicate address detection process in a time period from activating network device 210-1 to network device 210-1 outputting the message. In this way, network device 210-1 may provide a notification message to the other network devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first network device, comprising:
one or more processors; and
one or more memories, communicatively coupled to the one or more processors, to:
 activate the first network device as being associated with a Virtual Router Redundancy Protocol (VRRP) group,
  where the VRRP group includes a plurality of network devices;
 provide, to a second network device, a first duplicate address detection message after activating the first network device,
  where the plurality of network devices includes the second network device, and
  the first duplicate address detection message including a virtual Internet Protocol (VIP) address of the VRRP group;
 receive, by the first network device and from the second network device, a second duplicate address detection message after providing the first duplicate address detection message,
  the second duplicate address detection message including a data link layer address, and
  the second duplicate address detection message identifying that the second network device has ownership of the VIP address of the VRRP group;
 compare the data link layer address and a Virtual Media Access Control (VMAC) address of the VRRP group after receiving the second duplicate address detection message; and
 disregard the second duplicate address detection message after comparing the data link layer address and the VMAC address of the VRRP group.

2. The first network device of claim 1, where the one or more processors are further to:
 determine that the first network device is to assume a master status in the VRRP group based on determining that the first network device is associated with a priority value that is higher than another priority value associated with the second network device.

3. The first network device of claim 1, where the one or more processors are further to:
 assign address information of the VRRP group to the first network device, and
  the first network device to route network traffic based on assigning the address information.

4. The first network device of claim 1, where the one or more processors are further to:
 determine that the second network device is associated with the VRRP group based on comparing the data link layer address and the VMAC address; and
 where the one or more processors, when disregarding the second duplicate address detection message, are to:
  disregard the second duplicate address detection message based on the second network device being associated with the VRRP group.

5. The first network device of claim 1, where the one or more processors are further to:
 receive information that associates the VIP address of the VRRP group and the VMAC address of the VRRP group; and
 where the one or more processors, when disregarding the second duplicate address detection message, are to:
  disregard the second duplicate address detection message based on the information that associates the VIP address of the VRRP group and the VMAC address of the VRRP group.

6. The first network device of claim 1, where the one or more processors are further to:
 receive network traffic from a host device after assigning a master status to the first network device,
  where the host device is associated with a subnetwork, and
  where the VRRP group is associated with the subnetwork; and
 provide, to another network, the network traffic based on receiving the network traffic from the host device that is associated with the subnetwork.

7. The first network device of claim 1, where the one or more processors, when activating the first network device as being associated with the VRRP group, are to:
 activate the first network device as being associated with the VRRP group after the first network device deactivates.

8. A non-transitory computer-readable medium storing instructions, the instructions comprising:
 one or more instructions that, when executed by one or more processors, cause the one or more processors to:
  activate a first network device as being associated with a Virtual Router Redundancy Protocol (VRRP) group,
   where the VRRP group includes a plurality of network devices;
  receive, from a second network device, a duplicate address detection message,
   where the plurality of network devices includes the second network device;
  compare a data link layer address associated with the duplicate address detection message and a Virtual Media Access Control (VMAC) address of the VRRP group; and
  disregard the duplicate address detection message after comparing the data link layer address and the VMAC address of the VRRP group.

9. The non-transitory computer-readable medium of claim 8, where the one or more instructions, when executed by the one or more processors, further cause the one or more processors to:
 assign a master status to the first network device; and
 provide a notification message based on assigning the master status to the first network device without having performed a duplicate address detection process in a time period from activating the first network device to providing the notification message.

10. The non-transitory computer-readable medium of claim 9, where the one or more instructions, when executed by the one or more processors, further cause the one or more processors to:

receive a second notification message that includes address information of the second network device; and determine that the second network device is associated with the VRRP group based on the address information of the second network device.

11. The non-transitory computer-readable medium of claim 9, where the one or more instructions, when executed by the one or more processors, further cause the one or more processors to:

assign a Virtual Internet Protocol (VIP) address of the VRRP group to the first network device based on assigning the master status to the first network device.

12. The non-transitory computer-readable medium of claim 8, where the one or more instructions, when executed by the one or more processors, further cause the one or more processors to:

receive address information of the second network device;

determine that the address information of the second network device corresponds to VRRP address information of the VRRP group; and determine that the second network device is associated with the VRRP group based on determining that the address information of the second network device corresponds to the VRRP address information of the VRRP group.

13. The non-transitory computer-readable medium of claim 8, where the one or more instructions, when executed by the one or more processors, further cause the one or more processors to:

determine to forego performing a duplicate address detection process after disregarding the duplicate address detection message.

14. The non-transitory computer-readable medium of claim 8, where the one or more instructions, when executed by the one or more processors, further cause the one or more processors to:

determine that the first network device is associated with a priority value that is higher than another priority value associated with the second network device; and assign a master status to the first network device based on the priority value being higher than the other priority value.

15. A method, comprising:

activating, by a first network device, the first network device as being associated with a Virtual Router Redundancy Protocol (VRRP) group, where the VRRP group includes a plurality of network devices;

receiving, by the first network device and from a second network device, a duplicate address detection message, where the plurality of network devices includes the second network device;

comparing, by the first network device, a data link layer address associated with the duplicate address detection message and a Virtual Media Access Control (VMAC) address of the VRRP group; and disregarding, by the first network device, the duplicate address detection message after comparing the data link layer address and the VMAC address of the VRRP group.

16. The method of claim 15, further comprising:

determining to forego performing a duplicate address detection process by the first network device after disregarding the duplicate address detection message.

17. The method of claim 15, further comprising:

determining that the second network device is a peer in the VRRP group after comparing the data link layer address and the VMAC address of the VRRP group; and where disregarding the duplicate address detection message comprises:

disregarding the duplicate address detection message after determining that the second network device is the peer in the VRRP group.

18. The method of claim 15, further comprising:

providing a neighbor solicitation message to the second network device; and where receiving the duplicate address detection message comprises:

receiving the duplicate address detection message after providing the neighbor solicitation message.

19. The method of claim 15, further comprising:

comparing a first priority level, of the first network device, and a second priority level of the second network device; and assigning a master status to the first network device after comparing the first priority level and the second priority level.

20. The method of claim 15, where disregarding the duplicate address detection message includes dropping a packet associated with the duplicate address detection message.

* * * * *